United States Patent
Lenir et al.

(10) Patent No.: US 7,571,100 B2
(45) Date of Patent: Aug. 4, 2009

(54) SPEECH RECOGNITION AND SPEAKER VERIFICATION USING DISTRIBUTED SPEECH PROCESSING

(75) Inventors: Philip Lenir, Montreal (CA); Andrew Hunt, Forestville (AU); Francois Corriveau, Blainville (CA)

(73) Assignee: Speechworks International, Inc., Boston, MA (US)

( * ) Notice: Subject to any disclaimer, the term of this patent is extended or adjusted under 35 U.S.C. 154(b) by 744 days.

(21) Appl. No.: 10/309,794

(22) Filed: Dec. 3, 2002

(65) Prior Publication Data
US 2004/0107107 A1    Jun. 3, 2004

(51) Int. Cl.
G10L 11/00    (2006.01)
G10L 21/00    (2006.01)
H04M 1/64    (2006.01)

(52) U.S. Cl. .................. 704/270.1; 704/270; 379/88.01; 379/88.17

(58) Field of Classification Search .................. None
See application file for complete search history.

(56) References Cited

U.S. PATENT DOCUMENTS

| | | | | |
|---|---|---|---|---|
| 5,897,616 | A * | 4/1999 | Kanevsky et al. | 704/246 |
| 5,915,001 | A * | 6/1999 | Uppaluru | 379/88.22 |
| 5,960,399 | A * | 9/1999 | Barclay et al. | 704/270.1 |
| 6,269,336 | B1 * | 7/2001 | Ladd et al. | 704/270 |
| 6,327,568 | B1 * | 12/2001 | Joost | 704/270.1 |
| 6,408,272 | B1 * | 6/2002 | White et al. | 704/270.1 |
| 6,574,601 | B1 * | 6/2003 | Brown et al. | 704/270.1 |
| 6,687,341 | B1 * | 2/2004 | Koch et al. | 379/88.17 |
| 6,760,697 | B1 * | 7/2004 | Neumeyer et al. | 704/201 |
| 6,785,653 | B1 * | 8/2004 | White et al. | 704/270.1 |
| 6,857,008 | B1 * | 2/2005 | Shenefiel | 709/219 |
| 6,859,776 | B1 * | 2/2005 | Cohen et al. | 704/270 |
| 6,915,262 | B2 * | 7/2005 | Reding et al. | 704/275 |
| 7,003,463 | B1 * | 2/2006 | Maes et al. | 704/270.1 |
| 7,251,602 | B2 * | 7/2007 | Ito et al. | 704/270 |
| 2001/0055370 | A1 * | 12/2001 | Kommer | 379/88.01 |
| 2003/0163739 | A1 * | 8/2003 | Armington et al. | 713/202 |

OTHER PUBLICATIONS

VoiceXML Forum, "Voice eXtensible Markup Language", Version 1.00 Specification, Mar. 7, 2000, Available at: http://www.voicexml.org/specs/VoiceXML-100.pdf.*

Kunins, "Answers to Your Questions about VoiceXML", Speak and Listen, VoiceXML Review vol. 1, Issue 4, published by VoiceXML Forum, available at: http://www.voicexmlreview.org/Apr2001/columns/Apr2001_speak_listen.html.*

SpeechWorks Upgrades Open Source VoiceXML Interpreter To Support Newly Released VoiceXML 2.0 Standard by Business/Technology Editors, Oct. 31, 2001 in Business Wire, 4 pages.

Integration Manual for OpenSpeech(TM) Browser 1.0 Platform Integration Kit released in Jan. 2001 by Speech Works.

* cited by examiner

*Primary Examiner*—David R Hudspeth
*Assistant Examiner*—Brian L Albertalli
(74) *Attorney, Agent, or Firm*—Chapin IP Law, LLC

(57) ABSTRACT

Processing a speech utterance by communicating between a local computer and a remote computer using a hyper text communication session. The local computer sends a recording of a speech utterance to the remote computer in the session, and receives a result from the remote computer, the result based on a processing of the recording at the remote computer.

47 Claims, 14 Drawing Sheets

```
1   <form id="airline_info ">
2   <block> Welcome to Boston Airlines. </block>
3   <field name= "membership">
4       <prompt>
5           If you are a member of Royal Boston Club, please say yes.
6           Otherwise, please say no.
7       </prompt>
8       <grammar>
9           yes | no
10      </grammar>
11      <filled>
12          <if cond= "membership = = 'no' ">
13              <subdialog src = "http://dialogmoduleserver/enroll_caller">
14          <elseif cond= "membership = = 'yes' ">
15              <subdialog src = "http://dialogmoduleserver/verify_caller">
16          <else/>
17          </if>
18      </filled>
19  </field>
20  </form>
```

```
1   <!-- subdialog enroll_caller -->
2   <form id="airline">
3     <field name="enroll-caller">
4       <prompt>
5         Please spell your name.
6       </prompt>
7       <grammar src = "http://grammarserver/name.grammar">
8   ...
9       <!-- Code for recognizing the name. -->
10  ...
11      <prompt>
12        Please speak your password.
13      </prompt>
14      <grammar src = "http://grammarserver/password.grammar">
15  ...
16      <!-- Code for recognizing the text of the password. -->
17  ...
18      <!-- Code for sending the test of the name and password, and audio
19           waveform of the password to a speech verification server. -->
20  ...
21      <!-- Code for requesting speech verification application to enroll caller as
22           a new member, add name to member list, and store the waveform in a
23           caller database. -->
24  ...
25    </field>
26  </form>
```

```
1   <!-- subdialog verify_caller -->
2   <form id=" ">
3     <field name="enroll-caller">
4       <prompt>
5         Please spell your name.
6       </prompt>
7       <grammar src = "http://grammarserver/name.grammar">
8       <prompt>
9         Please speak your password.
10      </prompt>
11      <grammar src = "http://grammarserver/password.grammar">
12      ...
13      <!-- Code for recognizing the text of the password and sending the text to
14      the speech verification sever to be compared with the saved password. -->
15      ...
16      <!-- Code for sending the audio waveform of the password to the speech
17      verification server and requesting the server to compare the waveform
18      with the stored waveform. -->
19      ...
20      <!-- Code for returning a message indicating whether the caller's spoken
21      password matches the stored password. -->
22      ...
23    </field>
24  </form>
```

SPEECH RECOGNITION AND SPEAKER VERIFICATION USING DISTRIBUTED SPEECH PROCESSING

TECHNICAL FIELD

This invention relates to distributed speech processing.

BACKGROUND

Computer-based interactive speech applications are designed to provide automated interactive communication, for example, for use in telephone-based voice-portals to answer incoming calls. A voice portal can take calls and perform various tasks based on the caller's speech. The tasks may include gathering information from callers, providing information to callers, and directing callers to appropriate parties.

Some speech applications are implemented using Voice Extensible Markup Language (VoiceXML 1.0 as defined by the World Wide Web Consortium) technology. Using VoiceXML technology, the flow of an automated dialog with a caller is controlled using one or more VoiceXML documents. Each document essentially specifies a part of the interaction between the computer and the caller in the form of a script. When a caller interacts with a system, a VoiceXML document is processed by a "browser" application to implement the specified dialogue, for example, to elicit information from a user and perform tasks based on user responses.

A VoiceXML document defines the flow of a portion of the dialogue, which may include forms and menus. A form defines an interaction for collecting values for a set of field items. For example, the field items may include credit card type, name of credit card holder, and expiration date of the card. Each field may specify a grammar that defines the allowable inputs for that field (e.g., a credit card number can only include numbers and not alphabets). A menu defines choices selectable by a user and tasks to be performed when a choice is selected. For example, a menu may contain a list of the names of stores that can be selected by the user, and universal resource locators (URL's) of additional VoiceXML documents maintained by the stores selected by the user. In response to a user selection, the web browser loads the VoiceXML document of the selected store, and performs additional dialogue tailored to the services provided by that store.

The VoiceXML documents are typically stored remotely from the computer hosting the browser application, and are retrieved by the browser application as they are needed. During the flow of a dialog, references (e.g., in a menu or form) in one VoiceXML document indicate to the browser application to retrieve other related documents. Based on the contents of the VoiceXML documents, the browser application invokes text-to-speech procedures or plays prompts to generate voice prompts based on instructions in the VoiceXML document and invokes a speech recognition procedure to recognize speech uttered by the user.

Text-to-speech procedures and speech recognition procedures are not necessarily hosted on the same computer that hosts the browser interpreting the VoiceXML script. For example, dedicated servers may host programs implementing these procedures, and whenever the browser needs the services of one of these procedures, it communicates with an appropriate server to invoke the procedure. In some systems, there may be multiple servers, for example, multiple speech recognition servers.

VoiceXML also provides a method for recording and sending the recorded audio from the browser to a server by using a <submit> tag in the VoiceXML document using a Hypertext Transfer Protocol (HTTP) POST command to send an audio recording as Multipurpose Internet Mail Extension (MIME)-encoded messages to the server. An audio recording may also be sent from a server to a browser by using a <submit> tag and a HTTP POST command. One application of this mechanism is to store and retrieve voice messages on the server.

SUMMARY

In general, in one aspect, the invention is directed towards a method for processing a speech utterance. The method includes communicating between a local computer and a remote computer using a hyper text communication session, including sending a recording of a speech utterance from the local computer to the remote computer in the session, and receiving a result from the remote computer, the result based on a processing of the recording at the remote computer.

Implementations of the invention may include one or more of the following features. The result characterizes a similarity of voice characteristics. The result indicates that a speaker who made the speech utterance is a known person. The result indicates a match of stored voice characteristics of a speaker. The method includes prompting the user. The method includes recording a speech utterance from the user using the local computer. The method includes using the local computer to receive a script that includes an instruction that instructs the local computer to prompt the user. The method includes using the local computer to receive a script that includes a universal resource locator of an application program that is run by the remote computer to process the recording. The script includes an instruction that instructs the local computer to perform a task based on the result received from the remote computer. The script includes extensible markup language tags. The script includes voice extensible markup language tags. The method includes processing the recording to determine a similarity of voices. The method includes processing the recording to indicate a likelihood that the speaker is a known person. The method includes processing the recording to indicate a match of stored voice characteristics. The method includes using the local computer to prompt a user to make the speech utterance. The hyper text communication session follows a hyper text transfer protocol. The hyper text transfer protocol is an HTTP protocol defined by World Wide Web Consortium.

In general, in another aspect, the invention is directed towards a method for processing a speech utterance. The method includes receiving a dialog file at a web browser, controlling a speech dialog using the received dialog file, receiving the speech utterance from a user as part of the speech dialog, encoding the speech utterance to generate an encoded speech utterance, sending a request containing the encoded speech utterance from the web browser to a web server, and receiving a response containing a result based on a processing of the encoded speech utterance from the web server.

Implementations of the invention may include one or more of the following features. The request contains an identifier to an application used to process the speech utterance. Receiving the dialog file includes receiving the dialog file from the web server. The dialog file includes a VoiceXML document. The encoded speech utterance comprises an MIME-encoded message. The request is sent from the web browser to the web server according to Hypertext Transfer Protocol. The response is sent from the web server to the web browser according to the Hypertext Transfer Protocol. The application includes a speech recognizer. The application is a speech recognizer and the result characterizes a similarity of voice characteristics.

In general, in another aspect, the invention is directed towards a method for processing a speech utterance. The method includes sending a dialog file from a server to a client, the dialog file containing statements for processing by the client to control a speech dialog; receiving at a server a request from the client in response to the client processing one of the statements, the request containing an encoded speech utterance; processing the encoded speech utterance by using the server; and sending a response from the server to the client, the response containing a result based on processing of the encoded speech utterance.

Implementations of the invention may include one or more of the following features. The dialog file includes a VoiceXML document. The encoded speech utterance includes an MIME-encoded message. The request is sent from the client to the server according to the Hypertext Transfer Protocol. The response is sent from the server to the client according to the Hypertext Transfer Protocol. Processing the encoded speech utterance includes applying a speech recognition application to process the encoded speech. Processing the encoded speech utterance includes applying a speaker verification application to process the encoded speech. The result characterizes a similarity of voice characteristics.

In general, in another aspect, the invention is directed towards a method for processing a speech utterance. The method includes receiving a speech utterance from a user, encoding the speech utterance to generate an encoded speech utterance; sending a request through a network to a server in a hyper text communication session, the request containing the encoded speech utterance and an identifier to an application used to process the speech utterance; and receiving a response from the server that contains a result based on a processing of the encoded speech utterance.

Implementations of the invention may include one or more of the following features. The request includes an HTTP POST request. The hyper text communication session includes a series of related HTTP requests and responses.

In general, in another aspect, the invention is directed towards an apparatus for processing a speech utterance. The an apparatus includes means for communicating with a remote computer using a hyper text communication session; means for sending a recording of a speech utterance to the remote computer in the session; and means for receiving a result from the remote computer, the result based on a processing of the recording at the remote computer.

Implementations of the invention may include one or more of the following features. The apparatus includes means for receiving the speech utterance from a user and converting the speech utterance into a recording. The means for sending the recording includes means for converting the recording to a Multipurpose Internet Mail Extension (MIME)-encoded message. The means for sending the recording includes means for sending the MIME-encoded message using a Hypertext Transfer Protocol (HTTP) POST command. The apparatus includes means for receiving a script that includes an instruction that instructs the apparatus to prompt a user. The script includes extensible markup language tags. The apparatus includes means for interpreting the extensible markup language tags.

In general, in another aspect, the invention is directed towards software stored on computer-readable media for causing a computer system to perform functions that include communicating between a local computer and a remote computer using a hyper text communication session, including sending a recording of a speech utterance from the local computer to the remote computer in the session, and receiving a result from the remote computer, the result based on a processing of the recording at the remote computer.

In general, in another aspect, the invention is directed towards software stored on computer-readable media for causing a computer system to perform functions that include receiving a dialog file at a web browser; controlling a speech dialog using the received dialog file; receiving a speech utterance from a user as part of the speech dialog; encoding the speech utterance to generate an encoded speech utterance; sending a request from the web browser to a web server, the request containing the encoded speech utterance; and receiving a response from the web server, the response containing a result based on a processing of the encoded speech utterance.

In general, in another aspect, the invention is directed towards software stored on computer-readable media for causing a computer system to perform functions that include sending a dialog file from a server to a client, the dialog file containing statements for processing by the client to control a speech dialog; receiving at a server a request from the client in response to the client processing one of the statements, the request containing an encoded speech utterance; processing the encoded speech utterance by using the server; and sending a response from the server to the client, the response containing a result based on processing of the encoded speech utterance.

In general, in another aspect, the invention is directed towards software stored on computer-readable media for causing a computer system to perform functions that include receiving a speech utterance from a user; encoding the speech utterance to generate an encoded speech utterance; sending a request through a network to a server in a hyper text communication session, the request containing the encoded speech utterance and an identifier to an application used to process the speech utterance; and receiving a response from the server that contains a result based on a processing of the encoded speech utterance.

In general, in another aspect, the invention is directed towards an apparatus that includes an input port to receive a speech utterance from a user as part of a speech dialog; and a web browser to receive a dialog file and control the speech dialog using the received dialog file, the web browser being configured to encode the speech utterance to generate an encoded speech utterance, to send a request containing the encoded speech utterance to a web server, and to receive a response containing a result based on a processing of the encoded speech utterance from the web server.

In general, in another aspect, the invention is directed towards a server computer that includes a storage to store a dialog file containing statements for processing by a client to control a speech dialog; an input/output port to send the dialog file to the client and to receive a request from the client in response to the client processing one of the statements, the request containing an encoded speech utterance; and an application to process the encoded speech utterance and to send a response containing a result based on processing of the encoded speech utterance to the client.

In general, in another aspect, the invention is directed towards a voice-enabled device that includes an input/output interface to receive a speech utterance from a user; a voice-enabled application configured to encode the speech utterance to generate an encoded speech utterance and send a request through a network to a server in a hyper text communication session, the request containing the encoded speech utterance and an identifier to an application used to process the speech utterance, the voice-enabled application further configured to receive a response from the server that contains a result based on a processing of the encoded speech utterance and to perform a function based on the result.

In general, in another aspect, the invention is directed towards a telephone call center that includes a call manager to receive a speech utterance of a user transmitted through a telephone network, the call manager configured to determine a telephone number dialed by the user to connect the user to the telephone call center, the call manager further configured determine a universal resource locator (URL) based on the telephone number; and a computer to run a speech browser application that performs the functions of retrieving a script based on the URL provided by the call manager, encoding the speech utterance into an encoded speech utterance, sending a request through a network to a server in a hyper text communication session, the request containing the encoded speech utterance and an identifier to an application used to process the speech utterance, and receiving a response from the server that contains a result based on a processing of the encoded speech utterance.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 10 shows an example of a root VoiceXML document for the airline automated answering application.

FIG. 11 shows an example of a VoiceXML document used to request information from a caller to enroll the caller as a new member.

FIG. 12 shows an example of a VoiceXML document used to verify the identity of a caller.

Like reference symbols in the various drawings indicate like elements.

DETAILED DESCRIPTION

Voice Application Systems

Figure 1:
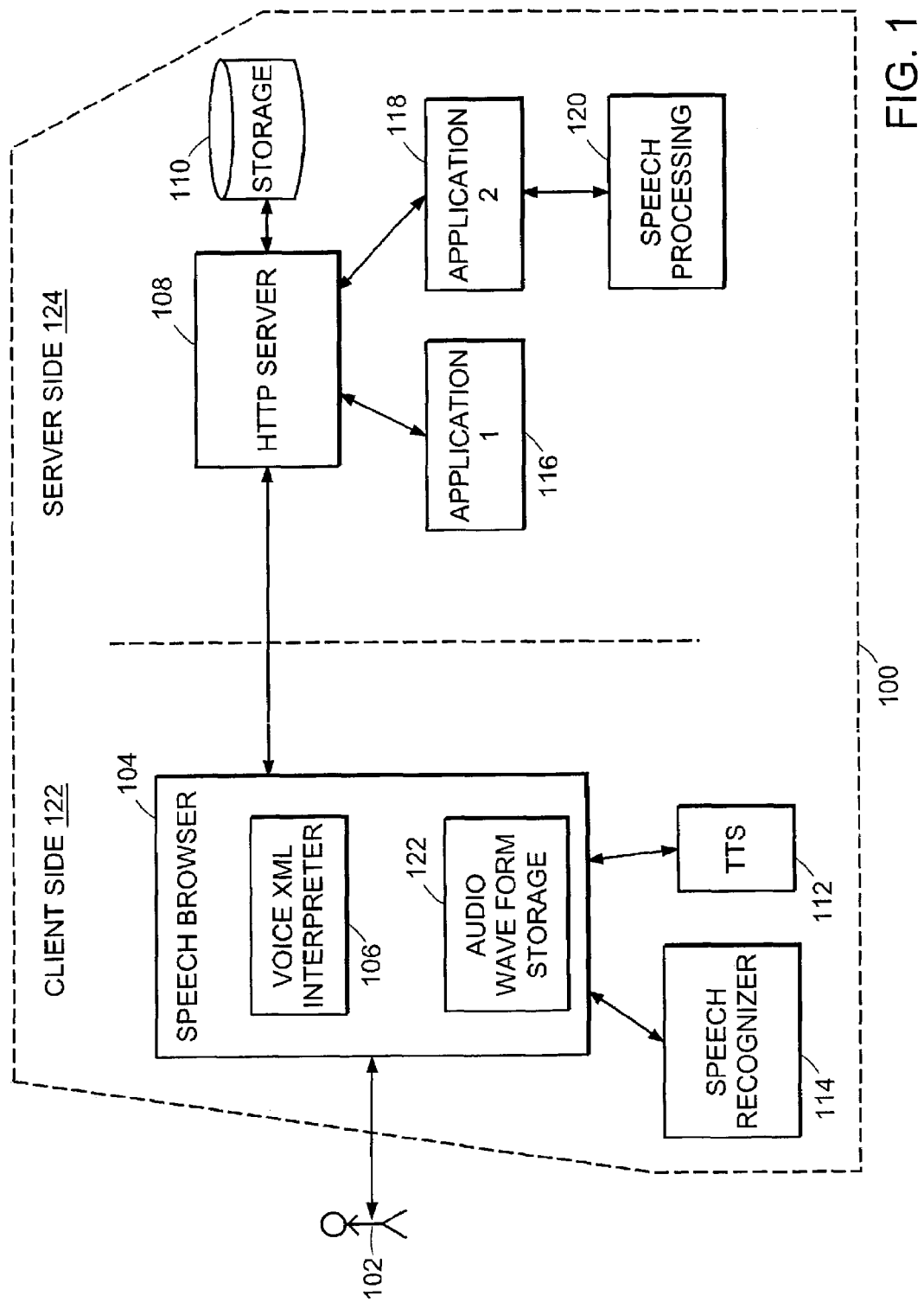
FIG. 1 shows a voice application system using VoiceXML technology.

Referring to FIG. 1, a voice application system 100 (enclosed in dashed lines) interacts by voice with a caller 102 to solicit information from the caller and/or provide services to the caller. System 100 includes a client side 122 and a server side 124 connected by a network (not shown). Client side 122 includes a browser module 104 that communicates with caller 102 by presenting audio prompts to and receiving audio responses from the caller. Browser 104 includes a VoiceXML interpreter 106 that processes speech dialogs expressed in scripts, such as VoiceXML documents. The VoiceXML documents contain statements that control the flow of a dialog. Browser 104 obtains VoiceXML documents it requires from server side 124, which includes an HTTP server 108. HTTP server 108 receives requests for particular VoiceXML documents or VoiceXML content generation operations from browser 104 and retrieves the VoiceXML documents from a storage module 110 or by executing program instructions which results in the generation of VoiceXML content.

When browser 104 is invoked by a call from caller 102, browser 104 uses a root VoiceXML document that specifies the flow of an initial dialog. For instance, the URL (Uniform Resource Locator) of the root document is pre-configured in browser 104. Browser 104 sends a request containing the URL of the root VoiceXML document to HTTP server 108. In response, HTTP server 108 sends the root VoiceXML document to browser 104. Browser 104 uses VoiceXML interpreter 106 to interpret the root VoiceXML document and controls the flow of an initial dialog based on statements in the VoiceXML document.

During the course of a dialog, browser 104 typically requests additional VoiceXML documents based on the input from caller 102.

Some statements in a VoiceXML document cause browser 104 to send a sequence of text to a text-to-speech (TTS) module 112, which results in a text being read to caller 102. Some statements cause browser 104 to request a pre-recorded audio prompt from a remote server and to play the audio prompt to caller 102. Some statements in the VoiceXML document cause browser 104 to receive audio signals representing speech spoken by caller 102. The audio signals are passed to a speech recognizer 114 under the control of a browser 104. The recognizer processes the audio signal and passes a recognized text back to browser 104. The recognized text may affect the further flow of the dialog. For example, a statement in a VoiceXML document may prompt caller 102 to make a selection from a menu list. Then, based on the caller's selection, the dialog may branch to different subdialogs.

One type of statement is a "form" statement, which has one or more fields. The form statement defines an interaction that collects values for each of the fields in the form. Each field may specify a prompt, the expected input, and evaluation rules to determine whether the input is valid. An example of a form statement is a request for a personal identification number (PIN). Upon being prompted to provide a PIN, caller 102 utters a PIN, and the speech utterance containing the spoken PIN is received by browser 104 as an audio signal.

System 100 may process an audio signal using different modes of operation. In one mode of operation, the audio signal is converted by speech recognizer 114 into text. Browser 104 sends the text to HTTP server 108 as part of an HTTP request sent to the server. The requests may be HTTP POST or GET requests. In a second mode of operation, browser 104 records the audio signal and then sends an encoding of the recorded audio signal as part of an HTTP request to HTTP server 108. In response to the request, the HTTP server may provide a document used to control a subdialog. HTTP server 108 may use the text or audio signal to select one document from a list of documents. When the encoded audio signal is sent as part of the request, the request may also contain an URL that identifies an application, such as a speech recognition application or a speaker verification application, at server side 124 that is used to process the encoded audio recording.

In the two modes of operation, the recognized text and the encoded recordings are sent to the HTTP server as part of requests sent from the browser to the HTTP server. Prior to sending the requests, the browser and the HTTP server establish a hyper text communication session, and the requests are sent in the communication session. The communication session may include a series of related requests and responses. The hyper text communication session may follow a predetermined protocol, such as the Hypertext Transfer Protocol defined by the World Wide Web Consortium. The hyper text communication session allows the browser to send requests containing ASCII or binary information to the HTTP server. The ASCII information may contain links to other application programs used to process information related to the dialog. The binary information may include audio recordings in the form of MIME-encoded messages. The hyper text communication session allows the HTTP server to transfer to the browser documents that contain scripts for controlling speech dialogs and links to other documents used to control subdialogs.

HTTP server 108 performs functions in addition to retrieving VoiceXML documents from storage module 110. HTTP server 108 is coupled to applications that process data sent from browser 104, and generate responses to requests from browser 104 in the form of VoiceXML documents. The VoiceXML documents may provide information requested by caller 102, or include statements that prompt caller 102 to provide additional information.

As an illustration, server side 124 includes applications 116 and 118, both of which relate to verifying the identity of a caller. Application 116 is used in the first mode of operation and processes text sent from the browser, while application 118 is used in the second mode of operation and processes recorded audio that is sent from the browser.

In this illustration, in a user interaction that makes use of application 116, caller 102 is prompted to speak a personal identification number (PIN). Caller 102 utters the PIN, e.g., "one-two-three-four." Browser 104 passes the audio of the caller's speech to speech recognizer 114, and speech recognizer 114 converts the speech utterance into a text string "1234." Speech recognizer 114 sends the recognized text to browser 104. Browser 104 then sends a HTTP POST or GET request containing the text string "1234" to HTTP server 108. The request also contains an identification of application 116. Based on the request, HTTP server 108 identifies application 116 as being responsible for handling the request and passes it to application 116. Application 116 matches the recognized PIN "1234" with a PIN number stored in a database corresponding to the name of the caller (this assumes that the name of the caller has already been given to application 116). If a match is found, application 116 passes a VoiceXML document back to HTTP server 108, which passes it to browser 104. The VoiceXML document is sent from HTTP server to browser 104 in the hyper text communication session previously established when the browser requests the root VoiceXML document from the HTTP server. VoiceXML interpreter 106 processes the response indicating that the PIN is correct and grants access to caller 102.

Continuing with the illustration, in a user interaction that makes use of application 118, caller 102 is again prompted to speak a PIN. Caller 102 utters a PIN, e.g., "one-two-three-four." Rather than using speech recognizer 114 to recognize the utterance, browser 104 stores the waveform of the utterance as an audio recording in a storage 122. Browser 104 then sends a request that includes the encoding of the audio recording to HTTP server 108 through a hyper text communication session using an HTTP POST request. The request also includes an identification of application 118. Based on the request, HTTP server 108 identifies application 118 as being responsible for handling the request and passes the request with the encoded audio to application 118. Application 118 passes the encoded audio recording to a speech processing module 120, which analyzes the speech utterance in the received audio recording to determine whether the utterance should be accepted.

In this illustration, speech processing module 120 performs a speech recognition function to determine the digits spoken by the caller. The module also performs a speaker verification function based on voice characteristics in the recorded utterance. In this illustration, we assume that browser 104 has already communicated the purported identity of the caller to module 120, and that the module has stored data representing that caller's voice characteristics. The speaker verification is done by comparing characteristics of the speech utterance in the audio recording with stored characteristics of the spoken PIN of the caller. As an example, if speech processing module 120 determines that the spoken PIN does not belong to the purported caller, application 118 passes a VoiceXML document back to HTTP server 108 which passes it to browser 104 indicating that the PIN is incorrect and denies access to the caller. The VoiceXML document is sent from HTTP server to browser 104 in the hyper text communication session previously established when the browser requests the root VoiceXML document from the HTTP server.

In other examples, sending a combination of text and audio recordings to application 118 may be used. For example, basic personal information, such as name and date of birth, may be recognized by speech recognizer 114. Text containing recognized name and date of birth, along with an audio recording containing the spoken password may be sent to application 118. Application 118 then uses both the text and the audio recording to verify identity of caller 102.

Figure 2:
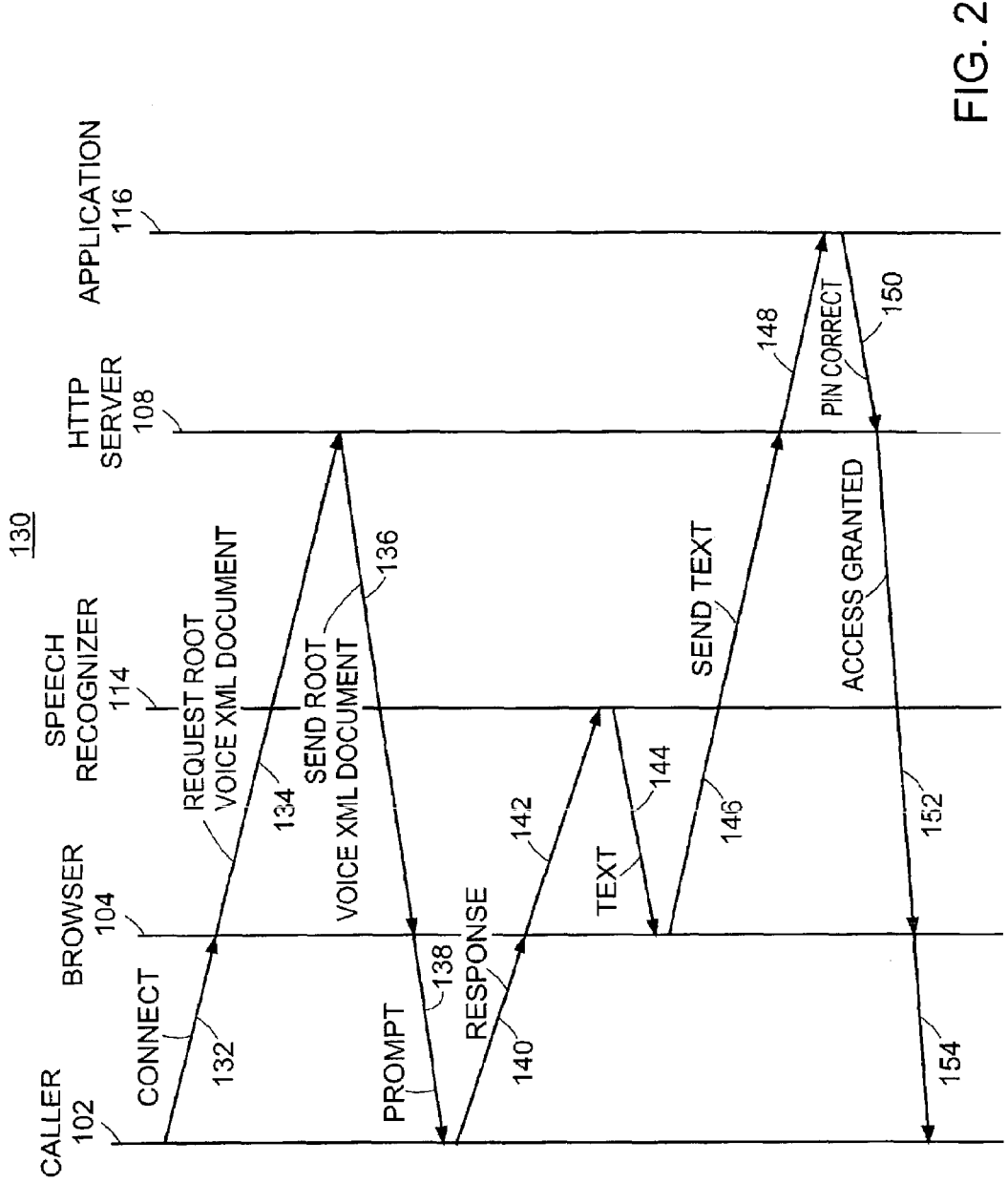
FIGS. 2 and 3 each show a timeline of a sequence of interactions between a caller, a browser, a speech recognizer, an HTTP server, and an application.

Referring to FIG. 2, a timeline 130 shows an example of a sequence of interactions in which a speech response is interpreted by speech recognizer 114 and a text representation of the speech response is communicated from the browser 104 to the HTTP server 108. In this example, caller 102 sends a PIN to application 116 to obtain access to a service.

Step 132: Caller 102 connects to browser 104.

Step 134: Browser 104 requests a root VoiceXML document from HTTP server 108.

Step 136: HTTP server 108 sends the root VoiceXML document to browser 104.

Step 138: VoiceXML interpreter 106 interprets the statements in the root VoiceXML document to control a dialog with the caller. A statement causes browser 104 to send a prompt to caller 102 asking for a PIN.

Step 140: Caller 102 utters a speech response to browser 104. In this example, caller 102 says "one-two-three-four."

Step 142: Browser 104 sends an audio signal representing the spoken PIN to speech recognizer 114.

Step 144: Speech recognizer 114 recognizes the audio signal and generates a text string "1234" containing an ASCII representation of the spoken PIN. The text string is sent back to browser 104.

Step 146: Browser 104 sends an HTTP POST or GET request containing the text string "1234" to HTTP server 108. The request identifies application 116.

Step 148: Based on the received request, HTTP server 108 invokes application 116 and passes the text string "1234" to application 116.

Step 150: Application 116 compares "1234" to a PIN stored in a database corresponding to the caller (the description of how the user name of the caller is communicated to application 116 is omitted). In this example, application 116 sends a VoiceXML document to HTTP server 108 indicating that a match has been found and that the PIN is correct.

Step 152: HTTP server 108 responds to the request from browser 104 (sent in step 146) by sending the VoiceXML document to browser 104.

Step 154: VoiceXML interpreter 106 processes the received VoiceXML document and continues the dialog with the user by playing a prompt indicating that the PIN was accepted.

Figure 3:
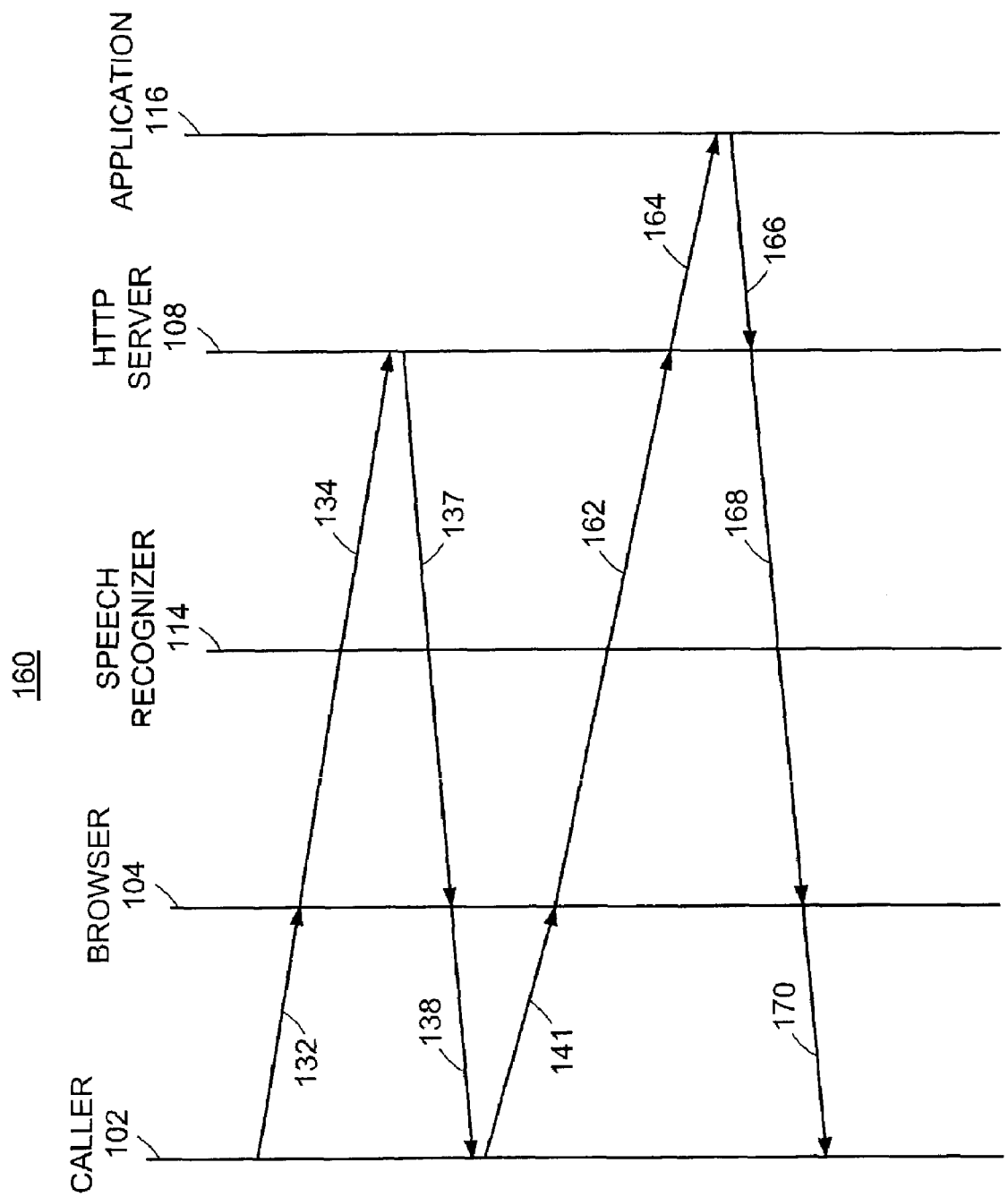

Referring to FIG. 3, a timeline 160 shows an example of a sequence of interactions in which a speech response is saved as an audio recording and sent from browser 104 to HTTP server 108. In this example, caller 102 sends a PIN to application 118 to obtain access to a service.

Step 132: Caller 102 connects to browser 104.

Step 134: Browser 104 requests a root VoiceXML document from HTTP server 108.

Step 137: HTTP server 108 sends the root VoiceXML document to browser 104. The root VoiceXML document includes instructions that specify how the caller's utterance is to be handled, so the root VoiceXML document sent in step 137 is different from the one sent in step 136.

Step 138: VoiceXML interpreter 106 interprets the statements in the root VoiceXML document, and sends a prompt to caller 102 asking for a PIN.

Step 141: Caller 102 utters a speech response to browser 104, e.g., "one-two-three-four." Browser 104 then saves an audio recording of the caller's speech response ("one-two-three-four) containing the spoken PIN. A statement in the root VoiceXML document received in step 137 causes the browser to execute step 162 so that the spoken PIN is recognized by a process at the server side 124 rather than at the client side 122.

Step 162: Browser 104 sends the audio recording to HTTP server 108 as part of a HTTP POST request. The audio recording is sent as an MIME-encoded message.

Step 164: HTTP server 108 forwards the audio recording to application 118.

Step 166: In addition to validating the spoken numbers, application 118 compares characteristics of the recorded "one-two-three-four" with a previously stored characteristics of a spoken PIN "one-two-three-four" uttered by caller 102. In this example, application 118 finds that the characteristics of the spoken words do not match close enough, even though the spoken numbers are the same. Application 118 sends a VoiceXML document to HTTP server 108; the VoiceXML document contains a statement indicating that a match was not found, and that access to the service of application 118 is denied.

Step 168: HTTP server 108 responds to the request from browser 104 (sent in step 162) by sending the VoiceXML document to the browser.

Step 170: VoiceXML interpreter 106 processes the received VoiceXML document and continues the dialog with the user by playing a prompt indicating that the PIN was denied.

Telephone Call Center

Figure 4:
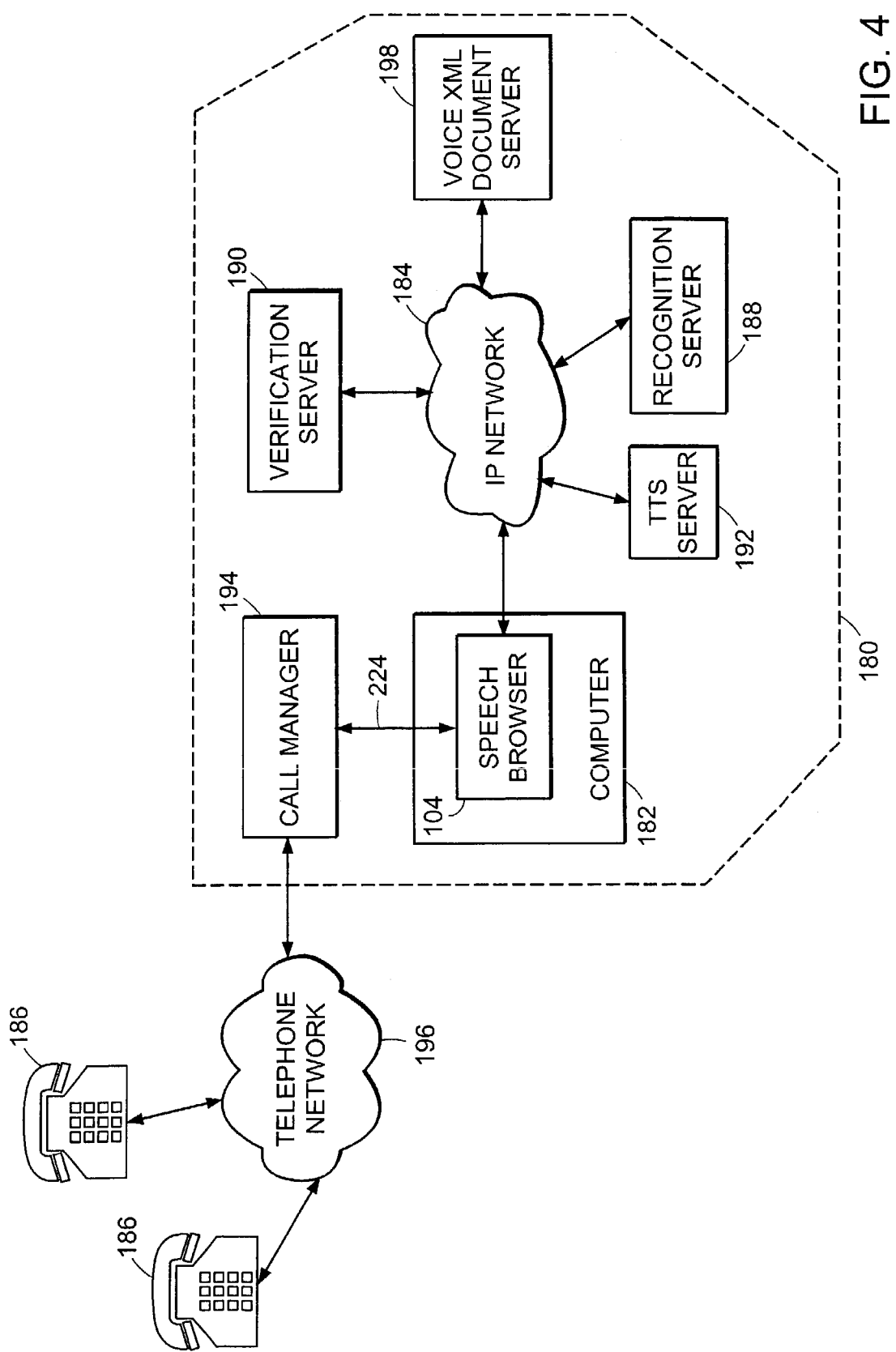
FIG. 4 shows a telephone call center using VoiceXML technology.

Referring to FIG. 4, an example of a system that makes use of the approach described above is in a telephone call center 180. Telephone call center 180 is an example of a voice application system that receives calls from callers and provides service based on the telephone numbers dialed by the callers. Call center 180 includes a computer 182 connected to a VoiceXML document server 198 through an Internet Protocol (EP) network 184. Computer 182 runs one or more instances of a speech browser 104. VoiceXML document server 198 includes a storage for storing VoiceXML documents. The speech browser 104 retrieves VoiceXML documents from server 198, and controls dialogs with one or more callers 186 based on the VoiceXML documents. Speech browser 104 receives speech utterances from callers 186 that are received by computer 182 as audio signals. Call center 180 may operate in two modes. In the first mode of operation, the audio signals are processed locally by computer 182. In the second mode of operation, the audio signals are stored as audio recordings, encoded, and sent in the form of encoded messages and as part of requests through the IP network 184 to other servers.

In the second mode of operation, browser 104 sends requests containing the encoded recordings to specialized speech-processing servers, such as a speech recognition server 188 and a speech verification server 190. Browser 104 may also send requests to servers (such as TTS server 192) and receive encoded audio recordings through IP network 184. Speech browser 104 sends the requests through a hyper text communications session. An HTTP POST request may be used to send an audio recording as an MIME-encoded message to the speech processing servers. To service the request, the speech-processing servers process the encoded recording and send the process result back to speech browser 104 in the form of a VoiceXML page. By communicating encoded recordings between a local computer and remote speech-processing servers using standard hyper text communication sessions, the speech processing capabilities of the local computer may be expanded in a convenient manner. The speech processing servers process speech from the callers 186 faster than the local computer, allowing the call center to respond faster to callers 186. This reduces awkward pauses while callers 186 wait for a response from the call center 180, resulting in more natural dialogs between callers 186 and call center 180.

The speech browsers and speech processing applications can be run in different computers. For example, it is possible to integrate speech browsers and speech processing applications that run under different operating systems, or on different computers. A speech browser can then invoke the service of a speech processing application by sending requests to the application using standard hyper text communication sessions and receive responses containing results of the processing by the applications.

Speech recognition server 188 runs instances of speech recognizers to recognize speech utterances from the caller. The TTS server 192 runs instances of TTS engines to synthesize audio used to greet the callers or prompt the callers. Speech recognition server 188 and TTS server 192 interact with speech browser 104 in a client-server manner.

Telephone call center 180 includes a call manager 194 that serves as a gateway between a telephone network 196 and the computer 182. When one of the callers 186 dials a telephone associated with the call center 180, the call is routed through the telephone network 196 to the call manager 194. Call manager 194 can be a private branch exchanges (PBX) or an automatic call distributor (ACD) with appropriate interfaces to connect computer 182. Each time call manager 194 receives a new call from a caller, call manager 194 invokes a new instance of speech browser 104 to process the call.

Call manager 194 uses an automatic number identification (ANI) service or a dialed number identification service (DNIS) to determine the number dialed by a caller, and passes this information to the speech browser 104. Call manager 194 also uses a DNIS to URL mapping table to determine a URL of a root VoiceXML document corresponding to the number dialed by the caller. Call manager sends the URL to the speech browser 104, which then sends a request to the VoiceXML document server 198 for the root VoiceXML document based on the URL. Document server 198 sends the root VoiceXML document back to the speech browser 104, which then initiates a dialog with the caller based on the VoiceXML document. For example, the speech browser 104 may send a greeting message to the caller, and prompt the caller to request information. When the caller utters a speech response, the response is interpreted by the speech browser 104. Based on the interpretation, the speech browser 104 may request additional documents from document server 108. The combination of the call manager, the speech browsers, speech processing servers, and document server enable callers to access a wide variety of services provided on the Internet.

Figure 5:
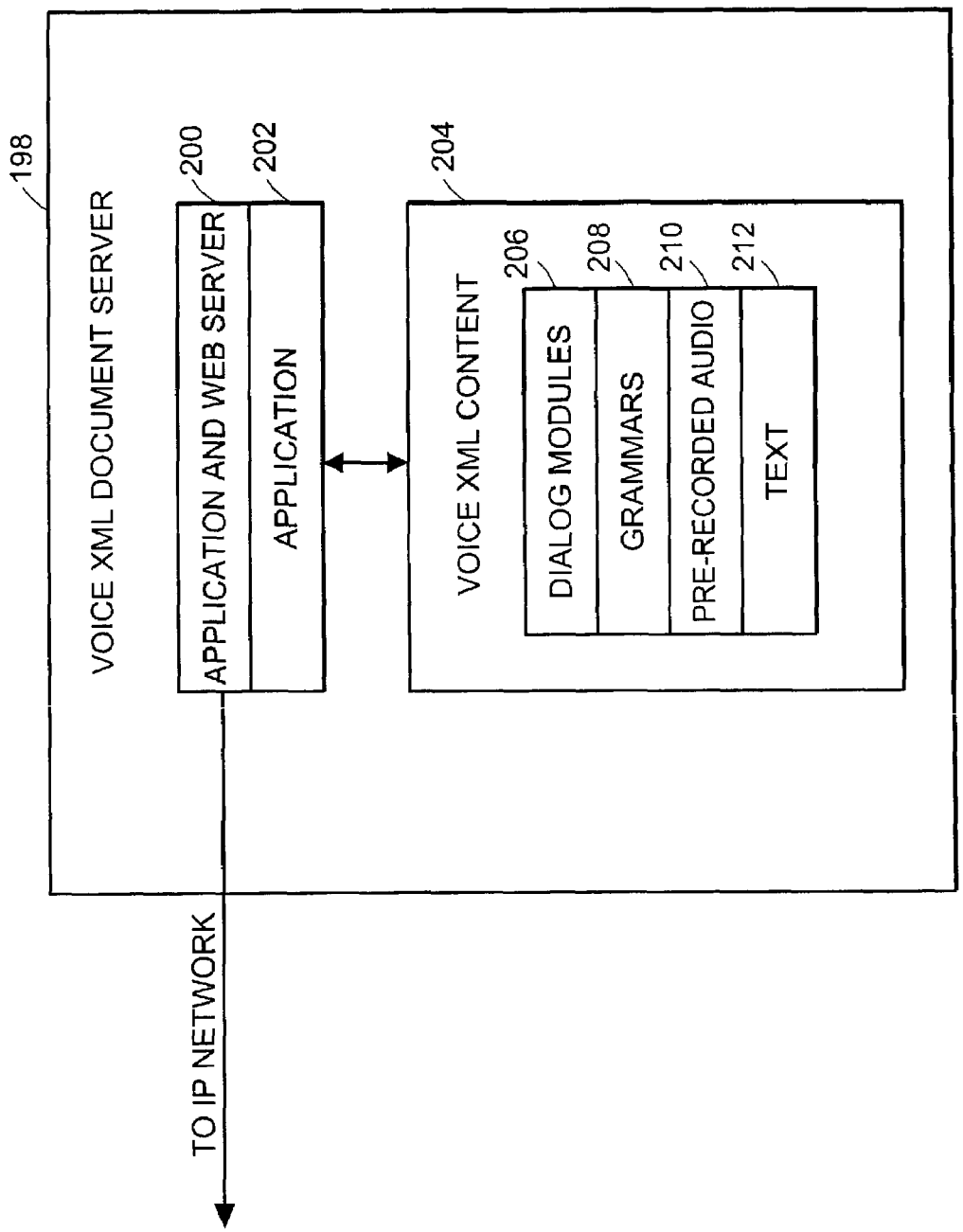
FIG. 5 shows a VoiceXML document server.

Referring to FIG. 5, document server 198 includes an application and web server 200 that interfaces with IP network 184 and sends and receives documents according to HTTP protocols. Web server 200 can be linked to one or more applications 202 that are used to process requests or to provide information to the callers. Application and web server 200 accesses a database 204 that stores VoiceXML content, such as Dialog Modules™ 206, grammars 208, pre-recorded audio 210, and text 212. Dialog Modules™ 206 are building blocks for speech applications, and can be used to manage error-recovery logic and call flow. Application and web server 200 provides Dialog Modules™ 206, grammars 208, pre-recorded audio 210, and text 212 to service requests from speech browser 104, which use the VoiceXML content to control dialogs with callers 186.

Figure 6:
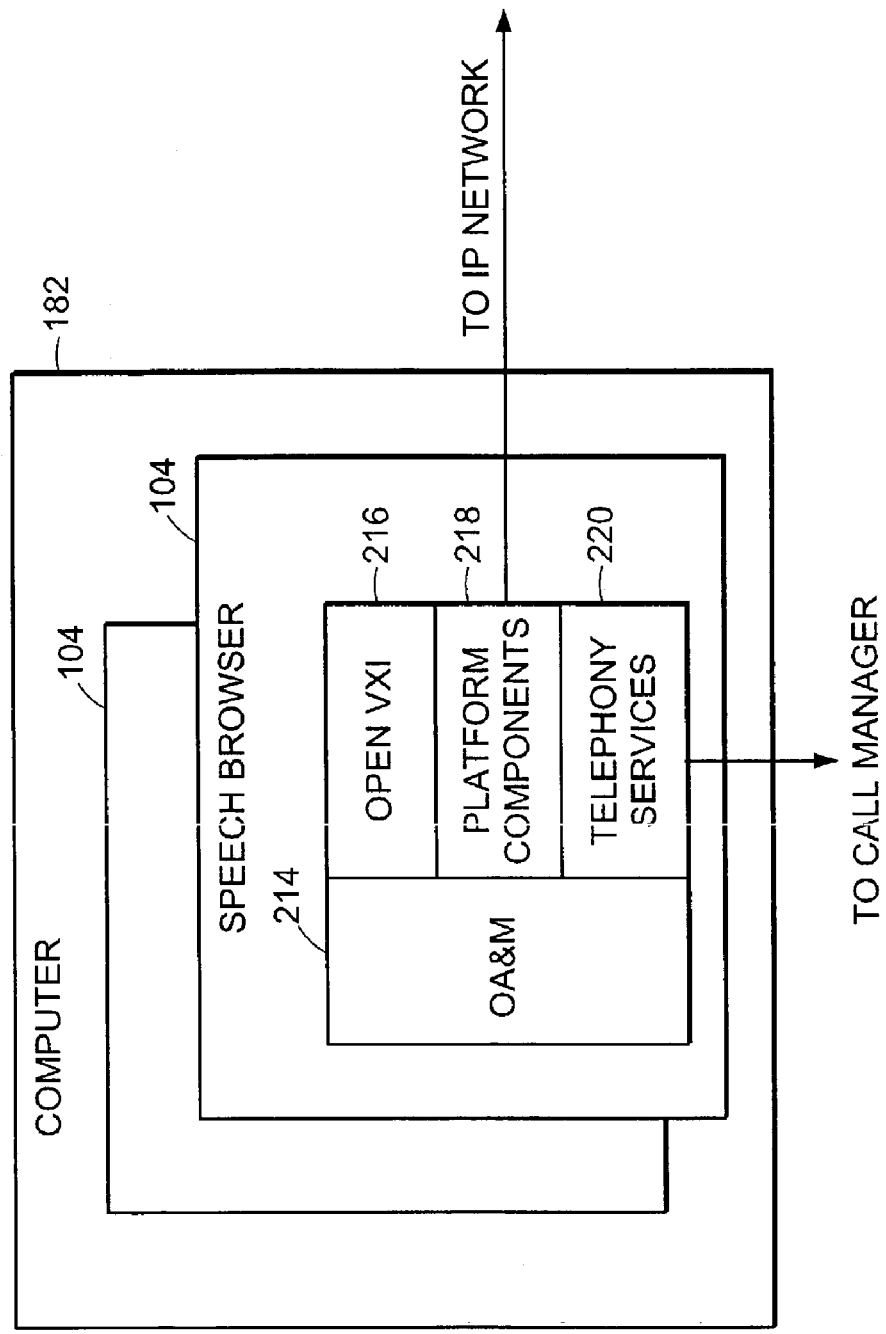
FIG. 6 shows a computer with speech browsers.

Referring to FIG. 6, each instance of speech browser 104 includes an operations, administration, and maintenance (OA&M) module 214, an OpenVXI module 216, platform components 218, and telephony services 220. OA&M module 214 includes a collection of tools responsible for system management and error reporting. OpenVXI module 216 interprets VoiceXML documents and calls the platform components module 218 to control dialogs based on the VoiceXML documents. Platform components 218 provide high-level services necessary to implement the speech browser, such as providing a recognition engine, a prompt engine, an Internet fetch library, and an ECMAScript engine. Telephony services 220 provide functions required to interface with call manager 194, for example, to receive information about the progress of the telephone call (such as whether the caller has hung up).

Speech recognition server 188 and TTS server 192 interact with platform components 218 in a client-server manner. Speech signals pass between call manager 194 and the speech-processing servers under the control of platform components 218. For example, the speech signals may pass through speech browser 104, or may pass through a separate data path for audio data.

In operation, when a caller 186 dials a telephone number associated with call center 180, call manager 194 causes an instance of a speech browser 104 to be created and notifies platform components 218 that there is an incoming call. Platform components 218 send an event to OpenVXI module 216, which causes a subroutine Run( ) to be executed to start processing of the phone call.

Call manager 194 determines the telephone number dialed by caller 186 and passes this information as a sessionArgs argument to the Run( ) call. Call manager 194 also determines the URL of a root VoiceXML document corresponding to the telephone number dialed by the caller and sends the URL as a name argument to the Run( ) call. OpenVXI toolkit 216 sends a request to document server 198 for the root VoiceXML document based on the URL. Document server 198 sends the root VoiceXML document back to interpreter 216. OpenVXI toolkit 216 controls platform components 218, for example, to send a greeting message to caller 186 and prompt the caller to request information. When the caller utters a speech response, an audio signal representing the speech response is sent to platform components 218, and is then recognized by OpenVXI module 216. The interpretation may result in the OpenVXI module 216 making additional document requests to the document server 198.

OpenVXI module 216 recognizes speech from caller 186 by invoking a voice recognition process local to computer 182, or by sending the audio signal to recognition server 188 for processing. The VoiceXML document that controls the current dialog specifies how the voice recognition is performed.

Figure 7:
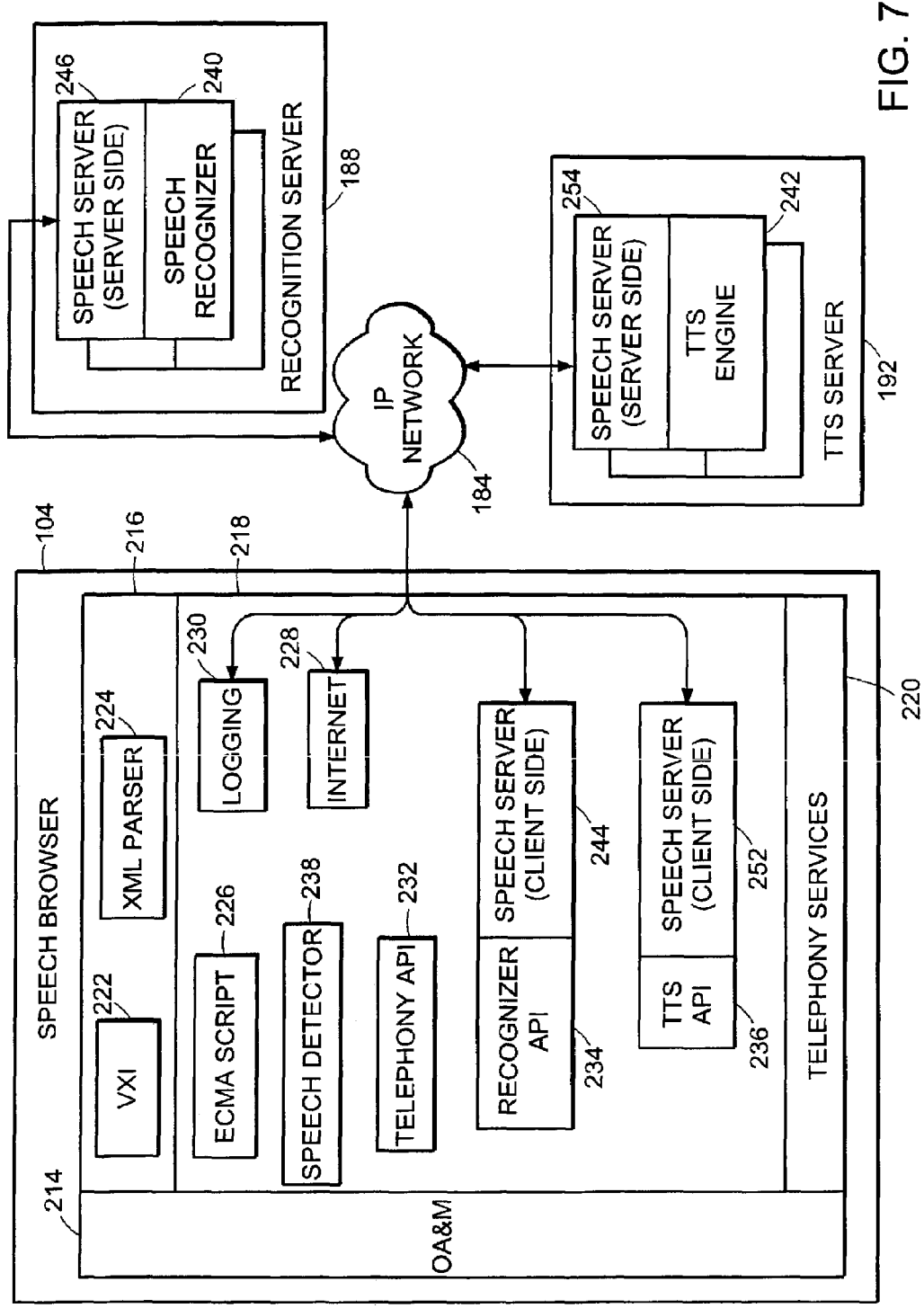
FIG. 7 shows the speech browser connected to a speech recognition server and a text-to-speech server through an IP network.

Referring to FIG. 7, an example of OpenVXI module 216 of speech browser 104 includes a VXI interpreter interface 222 and an XML parser API 224. VXI interpreter interface 222 is used to interpret VoiceXML markup tags. VXI interpreter interface 222 implements VoiceXML 1.0 language and supports most of the features in VoiceXML 2.0. XML parser API 224 calls open source application programming interfaces (APIs) (e.g., Apache Xerces API) to parse XML markup tags. Platform components 218 include an ECMA script interface 226 that provides access to ECMAScript execution services using the open source Mozilla SpiderMonkey engine. Platform components 218 include an Internet interface 228 that provides access to application documents through hyper text communications sessions. Data is sent to remote servers as part of HTTP POST or GET requests. Remote servers service the requests by processing the data and sending additional data back to browser 104 through Internet interface 228. Internet interface 228 is implemented using modules from the open source W3C Libwww library. Platform components 218 include a logging interface 230 that is used to report errors, events, and diagnostic messages to system operators. Logging interface 230 logs the events to a file and optionally to a standard output device.

Platform components 218 include a speech detector 238, a telephony API 232, a speech recognizer API 234, and a text-to-speech (TTS) API 236. Speech detector 238 is used to detect the start and end of a speech within the audio stream. Telephony API 232 is used as the interface to the telephony services 220. Recognizer API 234 is used as the interface to a speech recognizer 240 that runs in the recognition server 188. TTS API 236 is used as the interface to a TTS engine 242 that runs in the TTS server 192.

Recognizer API 234 communicates with speech recognizer 240 through a speech server module. The speech server module includes a client-side unit 244 that is part of platform components 218 and a server side unit 246 that resides in the recognition server 188. Likewise, TTS API 236 communicates with a TTS engine 248 through a speech server module 250. Speech server module 250 includes a client-side unit 252 that is part of platform components 120 and a server-side unit 254 that resides in the TTS server 192. Different speech recognizers (e.g., 240) may specialize in recognizing different types of speech, and different TTS engines (e.g., 242) may have particular pre-recorded audio segments suitable for certain types of prompts. By using a client-server model, speech browser 104 may utilize several TTS engines and speech recognizers, depending on their availability and functionality.

Figure 8:
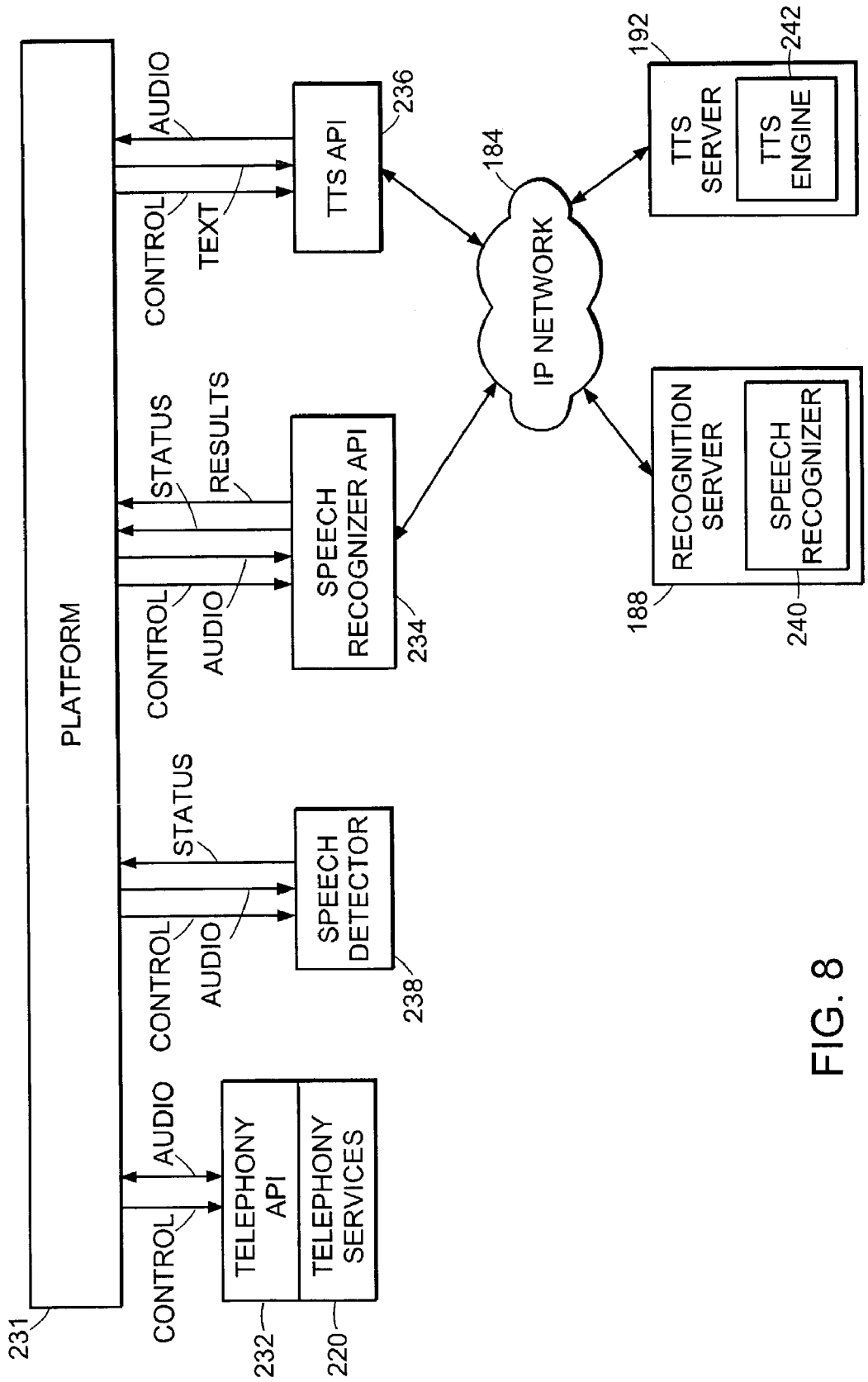
FIG. 8 shows a signal flow diagram of various components of the telephone call center.

FIG. 8 shows an interaction between these units. Platform 231 (which is a collection of software modules within browser 104 that interacts with telephony hardware and manages the overall system) reads an audio stream from telephony services 220 through the telephony API 232. Platform 231 passes the audio stream to speech detector 238 to determine the start and end of a speech within the audio stream. Platform 231 then passes the audio with detected speech to the speech recognizer 240 through speech recognizer API 234, and reads the results of the speech recognition from speech recognizer 240. When a message needs to be played to the caller, platform 231 sends a text file to the TTS engine 242 through TTS API 236, and receives an audio stream that is an audio representation of the text file from the TTS engine 242.

Airline Automated Answering Application

Figure 9:
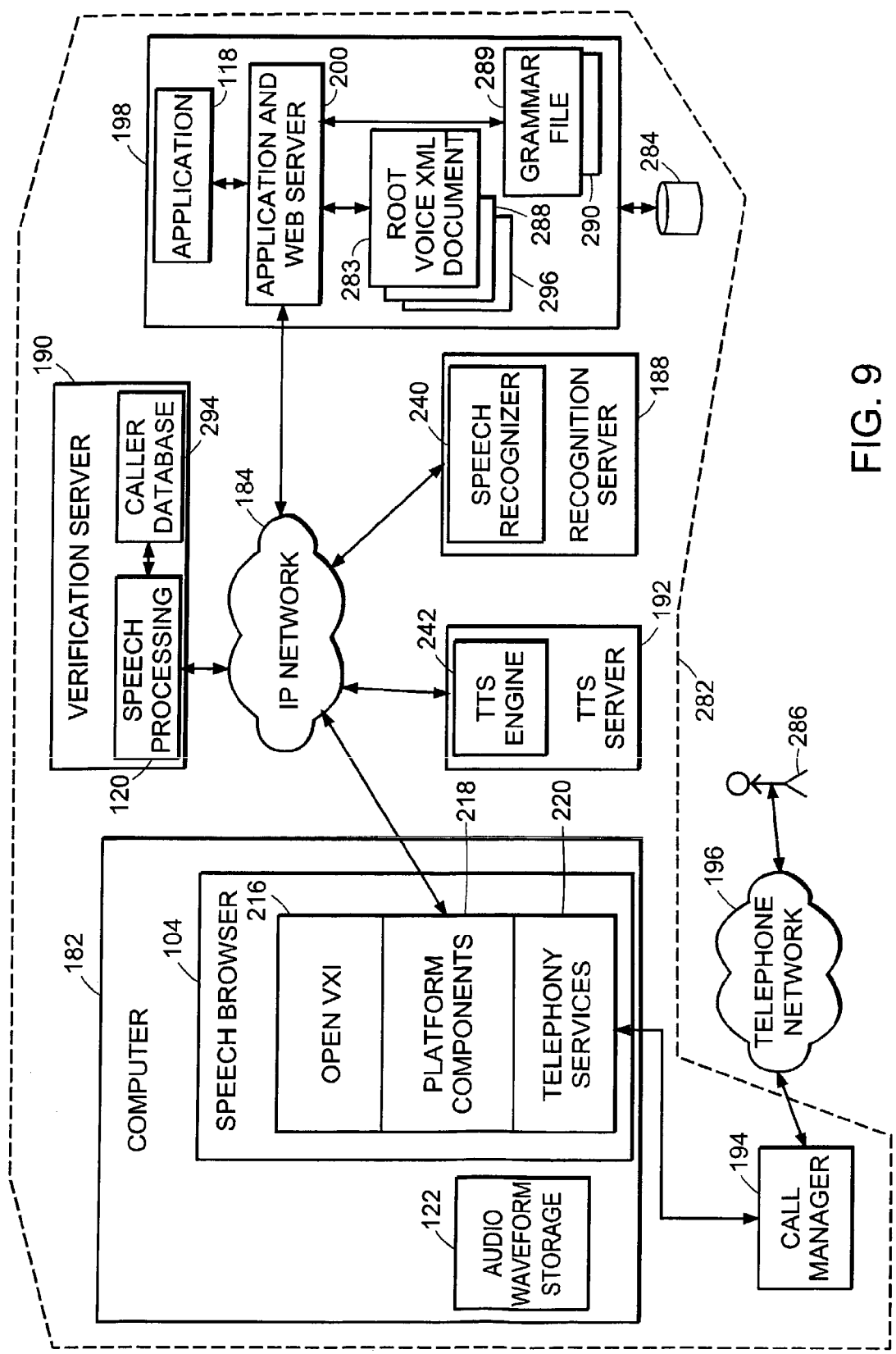
FIG. 9 shows an airline automated answering application.

FIG. 9 shows an airline automated answering application 282 that can provide information to callers who are registered users of an airline club, to enroll new users, and to verify the identities of the callers. FIG. 10 shows an example of a root VoiceXML document 283 for implementing application 282. Document 283 can be stored in the document server 198, or in a database 284 linked to document server 198. The VoiceXML document has instructions used to control a dialog that includes a greeting message and prompts that request information from the caller.

The following describes the steps for processing a call from a caller 286 directed to the airline automated answering application 282 using the VoiceXML document 283.

Step 400: Upon receiving a call from caller 286 dialing the airline toll free service number, call manager 194 determines the phone number that the caller dialed by using the DNIS service.

Step 415: Call manager 194 then and looks up the DNIS to URL mapping table to determine the corresponding URL.

Step 420: The call manager invokes an instance of speech browser 104 and passes the UTRL to the browser.

Step 425: Browser 104 requests the root VoiceXML document 283 from document server 198.

Step 430: Document server 198 sends the document 283 to browser 104.

Step 435: OpenVXI 216 of browser 104 interprets the greeting message "Welcome to Boston Airlines" in document 283, and sends the text of the greeting message to TTS engine 242. The communication between browser 104 and TTS server 192 is achieved using a speech server module having a client side unit 252 and a server side unit 254 (see FIG. 7).

Step 440: TTS engine 242 synthesizes an audio waveform of the greeting message, and sends the audio waveform to platform components 218, which forwards the waveform to call manager 194 and to caller 286.

Step 445: OpenVXI 216 interprets the prompt "If you are . . . please say no," and sends the text of the prompt to TTS engine 242.

Step 450: TTS engine 242 returns an audio waveform of the prompt, which is forwarded to caller 286.

Step 455: The caller makes a speech utterance.

Step 460: The waveform of the utterance is sent to speech recognizer 240 to determine whether the caller said "yes" or "no." The communication between browser 104 and recognition server 188 is achieved using a speech server module with a client side unit 244 and a server side unit 246 (see FIG. 7).

Step 465: Speech recognizer 240 recognizes the waveform, and sends the result back to OpenVXI 216.

Step 470: If the result is "no," OpenVXI 216 invokes a subdialog by loading another VoiceXML document with URL "http://dialogmoduleserver/enroll_caller."

Step 475: IF the result is "yes," OpenVXI 216 invokes a subdialog by loading another VoiceXML document with URL "http://dialogmoduleserver/verify_caller."

Referring to FIG. 11, if the caller responds by saying "no," indicating he/she is not a member, browser 104 loads a VoiceXML document 288 to perform a dialog that requests personal information from the caller, including name and password. The following steps are used to enroll the caller as a new member of the club.

Step 480: Browser 104 loads a grammar file 288 from the URL "http://grammarserver/name.grammar." In the example illustrated in FIG. 9, grammar files are stored in document server 198. In other examples, the grammar files may be stored in separate grammar servers.

Step 485: Browser 104 asks the caller for his/her name.

Step 490: The caller speaks his/her name.

Step 495: Browser 104 saves the audio recording of the spoken name in audio waveform storage 122.

Step 500: Browser 104 sends the audio recording of the spoken name and the name grammar to speech recognizer 240 to recognize the name.

Step 505: Speech recognizer 240 recognizes the utterance, and sends the recognized name back to browser 104.

Step 515: Browser 104 loads a grammar file 290 from the URL "http://grammarserver/password.grammar."

Step 520: Browser 104 asks the caller for a password.

Step 525: The caller speaks a password.

Step 530: Browser 104 saves the audio recording of the spoken password in audio waveform storage 122.

Step 535: Browser 104 sends the audio recording and the password grammar to speech recognizer 240 to recognize the password.

Step 540: Speech recognizer 240 processes the audio recording to recognize the spoken password, and sends the recognized password back to browser 104.

Step 542: Browser 104 sends the text of the recognized name and password, and the audio recording of the spoken password to the application and web server 200 as part of a HTTP POST request. The audio recording is attached to the request as an MIME-encoded message. The request identifies application 118 as responsible for handling the request, and identifies the caller as a new member of the airline club.

Step 544: Server 200 passes the information about the new member to application 118. Application 118 passes the recognized name and password and the audio recording to a speech processing module 120 residing at a verification server 190. Application 118 sends an instruction to speech processing module 120 indicating that the caller is a new member of the airline club.

Step 546: Speech processing module 120 enrolls the caller as a new member, adds his/her name to a member list, and stores the recognized password and the audio waveform of the spoken password in a caller database 294.

Step 550: Speech processing module 120 sends a message to application and web server 200 indicating that enrollment was successful. Server 200 sends a response message to browser 104 to indicate that the caller successfully enrolled as a new member.

Referring to FIG. 12, if the caller responds by saying "yes," indicating that he/she is a member, browser 104 loads a VoiceXML document 296 to perform a dialog that requests the name and password from the caller. The following steps are used to verify the identity of the caller.

Step 555: Browser 104 loads the grammar file 288 from "http://grammarserver/name.grammar."

Step 560: Browser 104 asks the caller for his/her name.

Step 565: The caller speaks his/her name.

Step 570: Browser 104 saves the caller's speech utterance in an audio recording, and sends the audio recording and the grammar file to speech recognizer 240.

Step 575: Speech recognizer 240 sends the recognized name back to browser 104.

Step 580: Browser 104 loads the grammar file 290 from "http://grammarserver/password.grammar."

Step 585: Browser 104 asks the caller for a password.

Step 590: The caller speaks a password.

Step 595: Browser 104 saves the audio recording of the spoken password.

Step 600: Browser 104 sends the audio recording and the password grammar to speech recognizer 240 to recognize the password.

Step 605: Recognizer 240 sends the recognized password back to browser 104.

Step 610: Browser 104 sends the text of the recognized name and password, and the audio recording of the spoken password to application and web server 200 as part of a HTTP POST request. The audio recording is attached to the request as an MIME-encoded message. The request identifies application 118 as responsible for handling the request, and identifies the caller as purporting to be an enrolled member.

Step 620: Server 200 passes the information about the caller to application 118. Application 118 passes the recognized name and password and the audio recording to speech processing module 120. Application 118 sends an instruction to speech processing module 120 indicating that the caller purports to be an enrolled member.

Step 622: Speech processing module 120 compares the recognized password with the password stored in caller database 294 corresponding to the recognized name. If a match occurs, module 120 then compares voice characteristics of the caller's password audio waveform with characteristics of the stored password audio waveform.

Step 624: Speech processing module 120 sends a message to application 118 indicating whether the caller's identity is verified. Application 118 sends the message as a response to the request from browser 104 sent in step 610.

Step 626: If the identity of the caller is verified, browser 104 continues the dialog based on another VoiceXML document and asks the caller what service he/she wishes to use.

Step 630: If the identity of the caller cannot be verified, browser 104 asks the caller for a password again, or transfer the call to a human operator to further assist the caller.

Figure 13:
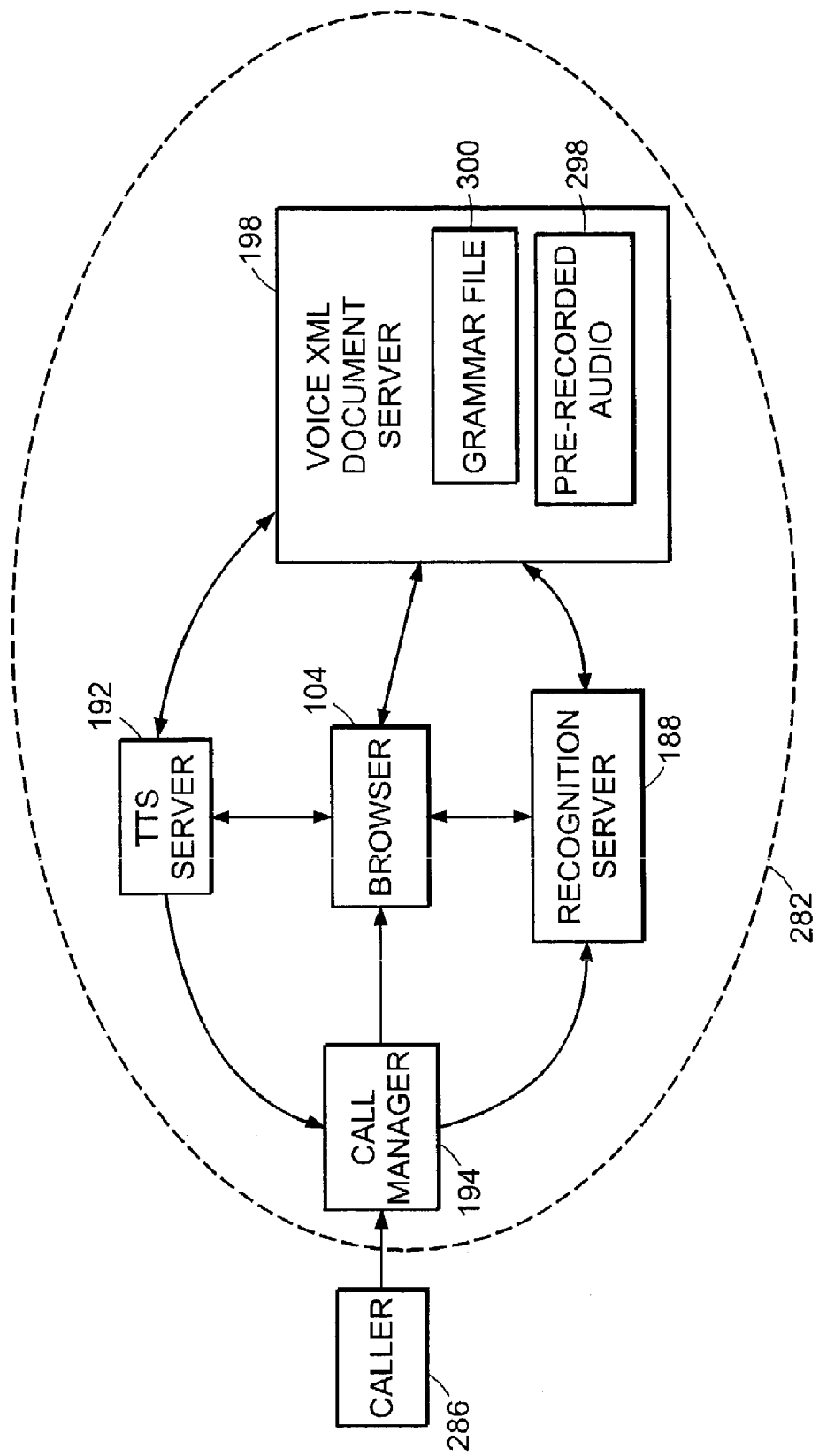
FIG. 13 shows an example of the airline automated answering application.

Referring to FIG. 13, in another example of the airline automated answering application 282, TTS server 192 and speech recognition server 188 can connect to ports of call manager 194 directly. In this case, when browser 104 needs to prompt a caller, browser 104 sends the text of the prompt and the port number of call manager 194 to TTS server 192. After synthesizing the audio waveform of the prompt, TTS server 192 sends the audio waveform directly to the designated port of call manager 194. If there are pre-recorded audio 298 stored in document server 198 that can be used in the synthesis of speech, browser 104 may also provide the URL of the pre-recorded audio 298 to TTS server 192, which then retrieves the pre-recorded audio 298 directly from document server 198. This reduces the time that the caller has to wait before he/she hears the prompt.

After synthesizing the prompt, browser 104 sends a message that includes a port number of call manager 194 and the URL of a grammar file 300 to speech recognition server 188. Speech recognition server 188 retrieves the grammar file 300 from document server 198 based on the URL. Speech recognition server 188 then receives audio stream from the designated port of call manager 194. By receiving the audio directly from call manager 194, the speech recognition process can be performed faster, reducing the time the caller has to wait for browser 104 to respond.

In the password verification process described above, the password audio recording is sent from browser 104 to verification server 190 in a standard hyper text communication session, i.e., the recording is attached to a standard request from the browser to the server. There is no need to setup a separate audio stream between browser 104 and verification server 190. The speech verification process may require a large amount of computation, and may require several seconds if performed by computer 182, especially if computer 182 is processing several incoming calls at the same time. This would require the caller to wait several seconds before he or she can access the services provided by call center 180 or airline automated answering application 282. By distributing the speech processing workload to a dedicated verification server, the speech verification process can performed in a shorter amount of time, reducing the caller's wait time. Browser 104 can be implemented with less hardware requirements while still being capable of providing complicated speech related services.

Figure 14:
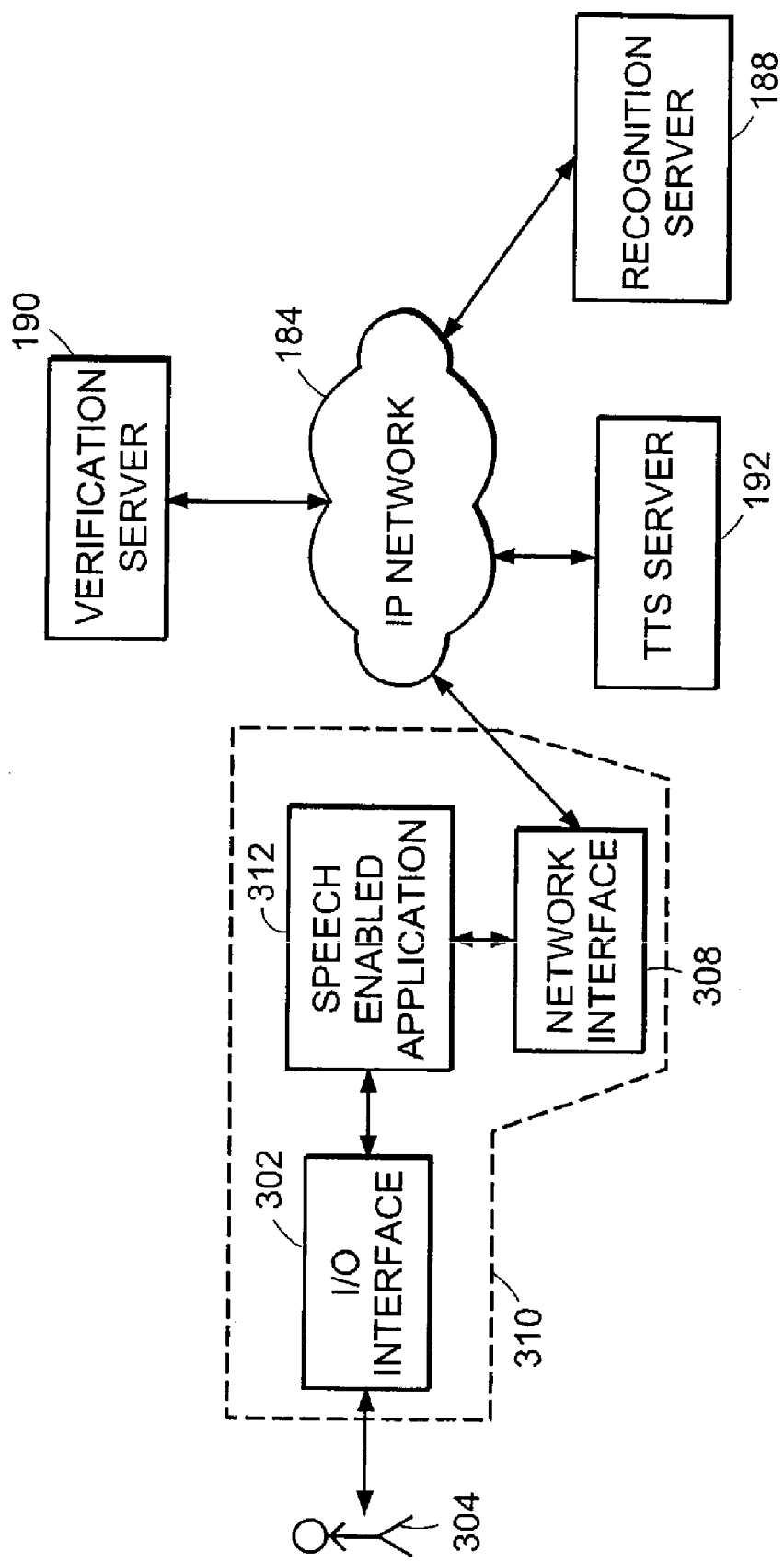
FIG. 14 shows a voice-enabled device.

Referring to FIG. 14, a voice-enabled device 310 running a voice-enabled application 312 may process speech utterances from a user 304 using the processing capabilities of remote servers without necessarily using a VoiceXML controlled dialog, while nevertheless passing audio to servers using a hypertext communication session. Application program 312 may be written in any computer language, as long as application can send requests in a hyper text communication session with the remote servers, and receive responses to the requests from the remote servers.

An I/O interface 302 converts speech utterances from the user 304 to an audio signal, which is encoded by application 312. Application sends the encoded audio signal through an IP network 184 to remote servers. The remote servers process the encoded audio signals and sends the processed results to device 310 so that the processed results can be used by application 312.

For example, device 310 may be a wireless device, and application 312 may be a program that provides information based on the user's commands. When device 310 is turned on, device 310 connects to the IP network 184 through a network interface 308. When the user utters a voice instruction, the instruction is captured by I/O device 302, which generates an audio signal that is sent to application 312. Application 312 encodes the audio signal (e.g., as an MIME encoded message), and sends the encoded audio signal as part of a request in a hyper text communication session. The hyper text communication session may be a series of related requests and responses. The hypertext communication session uses the HTTP protocol, or alternatively uses another similar protocol.

The request is directed to the server and identifies the application that is run on the server for processing the encoded audio signal.

In one example, application 312 sends the encoded audio signal as part of a request (e.g., an HTTP POST request) to verification server 190 to verify identity of the user. In response to the request, server 190 processes the encoded audio signal, and sends back a message containing the processed result. The message may be a plain text string indicating whether the driver's identity is verified. The result may also contain formatted text, such as HTML- or XML-encoded messages, or uses another markup approach.

After the user's identity is verified, application 312 may send an encoded audio signal representing the driver's voice instruction to recognition server 188. The encoded audio signal is sent as part of a request (e.g., an HTTP POST request) to server 188. In response, server 188 processes the encoded audio signal to generate text representing recognized speech. The text is sent in a message from server 188 to device 310. The message may also contain markup tags. Application 312 then provides information to the driver based on the recognized speech.

When application 312 needs to prompt the driver, the text of the prompt is sent to TTS server 192 as part of a request (e.g., HTTP POST or HTTP GET). In response, server 192 generates an audio signal or a binary representation of the text, and sends the audio signal or binary representation to device 310. Application 312 then sends the audio signal (or converts the binary representation into an audio signal) to I/O interface 302, which plays the audio message to the driver.

Speech browser 104 in FIG. 1 may be implemented in hardware, software, or a combination of the two. Browser 104 may be implemented in computer programs executing on programmable computers or other machines that each include a processor, a storage medium readable by the processor (including, but not limited to, volatile and non-volatile memory and/or storage components).

Each such program may be implemented in a high level procedural or object-oriented programming language to communicate with a computer system. However, the programs can be implemented in assembly or machine language. The language may be a compiled or an interpreted language.

Each computer program may be stored on a storage medium/article (e.g., CD-ROM, hard disk, or magnetic diskette) that is readable by a general or special purpose programmable computer for configuring and operating the computer when the storage medium or device is read by the computer to implement the arithmetic logic circuits. Browser 104 may also be implemented as a machine-readable storage medium, configured with a computer program, where, upon execution, instructions in the computer program cause a machine to operate to process speech dialogs.

A number of embodiments of the invention have been described. Nevertheless, it will be understood that various modifications may be made without departing from the spirit and scope of the invention. Accordingly, other embodiments are within the scope of the following claims.

What is claimed is:

1. A method for processing a speech utterance in which a local computer accesses instructions from computer storage and executes the instructions to perform steps of:
    recording a speech utterance from a user using the local computer;
    communicating between the local computer and a remote computer using a hyper text communication session, including:
    sending the recording of the speech utterance from the local computer to the remote computer in the session; and
    receiving a result from the remote computer, the result based on a processing of the recording at the remote computer including analyzing the speech utterance in the recording using a speech recognition application at the remote computer;
    wherein the computer-implemented method further comprises using the local computer to receive a script that includes a universal resource locator of an application program that is run by the remote computer to process the recording, the script includes an instruction that instructs the local computer to perform a task based on the result received from the remote computer.

2. The computer-implemented method of claim 1 in which the result characterizes a similarity of voice characteristics.

3. The computer-implemented method of claim 1 in which the result indicates that a speaker who made the speech utterance is a known person.

4. The computer-implemented method of claim 1 in which the result indicates a match of stored voice characteristics of a speaker.

5. The computer-implemented method of claim 1, further comprising prompting the user.

6. The computer-implemented method of claim 5, further comprising using the local computer to receive a script that includes an instruction that instructs the local computer to prompt the user.

7. The computer-implemented method of claim 1 in which the script includes extensible markup language tags.

8. The computer-implemented method of claim 7 in which the script includes voice extensible markup language tags.

9. The computer-implemented method of claim 1, further comprising processing the recording to determine a similarity of voices.

10. The computer-implemented method of claim 1, further comprising processing the recording to indicate a likelihood that the speaker is a known person.

11. The computer-implemented method of claim 1, further comprising processing the recording to indicate a match of stored voice characteristics.

12. The computer-implemented method of claim 11, further comprising using the local computer to prompt a user to make the speech utterance.

13. The computer-implemented method of claim 1 in which the hyper text communication session follows a hyper text transfer protocol.

14. The computer-implemented method of claim 13 in which the hyper text transfer protocol is an HTTP protocol defined by World Wide Web Consortium.

15. The computer-implemented method of claim 1 in which the local computer is a web browser and the remote computer is a web server.

16. A computer-implemented method in which a computer accesses instructions from computer storage to execute a web browser process comprising steps of:
    receiving a dialog file at the web browser;
    controlling a speech dialog using the received dialog file;
    receiving a speech utterance from a user as part of the speech dialog;
    encoding the speech utterance to generate an encoded speech utterance;
    sending a request from the web browser to a web server according to Hypertext Transfer Protocol, the request containing the encoded speech utterance; and receiving a response from the web server, the response containing a result based on a processing of the encoded speech utterance including analyzing the encoded speech utterance using a speech recognition application at the web server, wherein the computer-implemented method further comprises receiving a script at the web browser that includes a universal resource locator associated with the speech recognition application, the script includes an instruction that instructs the web browser to perform a task based on the result received from the web server.

17. The computer-implemented method of claim 16 in which the request contains an identifier to an application used to process the speech utterance.

18. The computer-implemented method of claim 16 in which receiving the dialog file comprises receiving the dialog file from the web server.

19. The computer-implemented method of claim 16 in which the dialog file comprises a VoiceXML document.

20. The computer-implemented method of claim 16 in which the encoded speech utterance comprises an MIME-encoded message.

21. The computer-implemented method of claim 16 in which the response is sent from the web server to the web browser according to Hypertext Transfer Protocol.

22. The computer-implemented method of claim 16 in which the application comprises a speech recognizer.

23. The computer-implemented method of claim 16 wherein the application is a speech recognizer and the result characterizes a similarity of voice characteristics.

24. A computer-implemented method in which a server accesses instructions from computer storage and executes the instructions to perform steps of:

sending a dialog file from the server to a client, the dialog file containing statements for processing by the client to control a speech dialog;

receiving at the server a request from the client in response to the client processing one of the statements, the request containing an encoded speech utterance and being sent from the client to the server according to Hypertext Transfer Protocol;

processing the encoded speech utterance by using the server including analyzing the encoded speech utterance using a speech recognition application; and sending a response from the server to the client, the response containing a result based on the processing of the encoded speech utterance;

wherein the computer-implemented method further comprises sending a script to the client that includes a universal resource locator associated with the speech recognition application, the script includes an instruction that instructs the client to perform a task based on the result received from the server.

25. The computer-implemented method of claim 24 in which the dialog file comprises a VoiceXML document.

26. The computer-implemented method of claim 24 in which the encoded speech utterance comprises an MIME-encoded message.

27. The computer-implemented method of claim 24 in which the response is sent from the server to the client according to the Hypertext Transfer Protocol.

28. The computer-implemented method of claim 24 in which processing the encoded speech utterance includes applying a speech recognition application to process the encoded speech.

29. The computer-implemented method of claim 24 in which processing the encoded speech utterance includes applying a speaker verification application to process the encoded speech.

30. The computer-implemented method of claim 24 in which the result characterizes a similarity of voice characteristics.

31. A method comprising:

receiving a speech utterance from a user at a speech browser;

encoding the speech utterance to generate an encoded speech utterance at the speech browser;

sending a request from the speech browser through a network to a server in a hyper text communication session, the request containing the encoded speech utterance and an identifier to a speech recognition application at the server used to process the encoded speech utterance by performing speech recognition on the speech utterance and obtaining recognition results based on the speech recognition; and receiving at the speech browser a response from the server that contains the recognition result based on the processing of the encoded speech utterance at the server.

32. The method of claim 31 in which the request comprises an HTTP POST request.

33. The method of claim 31 in which the hyper text communication session comprises a series of related HTTP requests and responses.

34. An apparatus comprising:

means for receiving a speech utterance from a user and converting the speech utterance into a recording at a local computer;

means for communicating between the local computer and a remote computer using a hyper text communication session;

means for sending the recording of the speech utterance from the local computer to the remote computer in the session;

means for receiving at the local computer a result from the remote computer, the result based on a processing of the recording at the remote computer, wherein the processing of the recording at the remote computer includes analyzing the speech utterance using a speech recognition application at the remote computer; and means for using the local computer to receive a script that includes a universal resource locator of the speech recognition application that is run by the remote computer to process the recording, the script includes an instruction that instructs the local computer to perform a task based on the result received from the remote computer.

35. The apparatus of claim 34 wherein the means for sending the recording comprises means for converting the recording to a Multipurpose Internet Mail Extension (MIME)-encoded message.

36. The apparatus of claim 35 wherein the means for sending the recording comprises means for sending the MIME-encoded message using a Hypertext Transfer Protocol (HTTP) POST command.

37. The apparatus of claim 34, further comprising means for receiving a script that includes an instruction that instructs the apparatus to prompt a user.

38. The apparatus of claim 37 wherein the script includes extensible markup language tags.

39. The apparatus of claim 38, further comprising means for interpreting the extensible markup language tags.

40. Computer-readable media comprising software for causing a computer system to perform functions comprising:

recording a speech utterance from a user using a local computer;
communicating between the local computer and a remote computer using a hyper text communication session, including
sending the recording of a speech utterance from the local computer to the remote computer in the session;
receiving a result from the remote computer, the result based on a processing of the recording at the remote computer, wherein the processing includes analyzing the speech utterance in the recording using a speech recognition application at the remote computer; and
using the local computer to receive a script that includes a universal resource locator associated with the speech recognition application that is run by the remote computer to process the recording, the script includes an instruction that instructs the local computer to perform a task based on the result received from the remote computer.

41. Computer-readable media comprising software for causing a computer system to perform functions comprising:
receiving a dialog file at a web browser;
controlling a speech dialog using the received dialog file;
receiving a speech utterance from a user as part of the speech dialog;
encoding the speech utterance to generate an encoded speech utterance;
sending a request from the web browser to a web server, the request containing the encoded speech utterance;
receiving a response from the web server, the response containing a result based on a processing of the encoded speech utterance including analyzing the encoded speech utterance using a speech recognition application at the web server; and
using the web browser to receive a script that includes a universal resource locator associated with the speech recognition application, the script includes an instruction that instructs the web browser to perform a task based on the result received from the web server.

42. Computer-readable media comprising software for causing a computer system to perform functions comprising:
sending a dialog file from a server to a client, the dialog file containing statements for processing by the client to control a speech dialog;
receiving at a server a request from the client in response to the client processing one of the statements, the request containing an encoded speech utterance;
processing the encoded speech utterance by using the server including analyzing the encoded speech utterance using a speech recognition application at the server;
sending a response from the server to the client, the response containing a result based on processing of the encoded speech utterance; and
sending a script from the server to the client, the script includes a universal resource locator associated with the speech recognition application and an instruction that instructs the client to perform a task based on the result received from the server.

43. Computer-readable media comprising software for causing a computer system to perform functions comprising:
receiving a speech utterance from a user at a speech browser;
encoding the speech utterance to generate an encoded speech utterance at the speech browser;
sending a request from the speech browser through a network to a server in a hyper text communication session, the request containing the encoded speech utterance and an identifier to an application at the server used to process the speech utterance by performing speech recognition on the speech utterance and obtaining recognition results based on the speech recognition; and
receiving a response at the speech browser from the server that contains the recognition result based on the processing of the encoded speech utterance.

44. An apparatus comprising:
an input port to receive a speech utterance from a user as part of a speech dialog; and
a web browser to receive a dialog file and control the speech dialog using the received dialog file, the web browser being configured to encode the speech utterance to generate an encoded speech utterance, to send a request containing the encoded speech utterance to a web server, and to receive a response from the web server, where the response a speech recognition result based on a speech recognition processing of the encoded speech utterance at the web server;
wherein the web browser receives a script that includes a universal resource locator associated with the web server, the script includes an instruction that instructs the web browser to perform a task based on the speech recognition result received from the web server.

45. A server computer comprising:
a storage to store a dialog file containing statements for processing by a client to control a speech dialog;
an input/output port to send the dialog file to the client and to receive a request using a hyper text communication session from the client in response to the client processing one of the statements, the request containing an encoded speech utterance; and
a speech recognition application to process the encoded speech utterance and to send a response containing a result based on the speech recognition processing of the encoded speech utterance to the client;
wherein the server computer sends a script to client, the script includes a universal resource locator associated with the server computer and an instruction that instructs the client to perform a task based on the result.

46. A voice-enabled device comprising:
an input/output interface to receive a speech utterance from a user;
a voice-enabled application at a speech browser configured to encode the speech utterance to generate an encoded speech utterance and send a request from the speech browser through a network to a server in a hyper text communication session, the request containing the encoded speech utterance and an identifier to a speech recognition application at the server used to process the speech utterance, the voice-enabled application further configured to receive a response from the server that contains a speech recognition result based on a processing of the encoded speech utterance at the server and to perform a function at the speech browser based on the speech recognition result;
wherein the voice-enabled application receives a script that includes a universal resource locator associated with the speech recognition application, the script includes an instruction that instructs the voice-enabled application to perform a task based on the speech recognition result received from the server.

47. A telephone call center comprising:
a call manager to receive a speech utterance of a user transmitted through a telephone network, the call manager configured to determine a telephone number dialed by the user to connect the user to the telephone call center, the call manager further configured determine a universal resource locator (URL) based on the telephone number; and a client computer to run a speech browser application that performs the functions of;
    retrieving a script based on the URL provided by the call manager,
    encoding the speech utterance into an encoded speech utterance,
    sending a request through a network to a server in a hyper text communication session, the request containing the encoded speech utterance and an identifier to a speech recognition application at the server used to process the speech utterance;
    receiving a response from the server that contains a recognition result based on a speech processing of the encoded speech utterance; and using the client computer to receive a script that includes a universal resource locator associated with the speech recognition application, the script includes an instruction that instructs the client computer to perform a task based on the recognition result.

* * * * *